(12) United States Patent
Crane et al.

(10) Patent No.: US 7,743,617 B2
(45) Date of Patent: Jun. 29, 2010

(54) CHILLER SOUND REDUCTION CONTROL SYSTEM AND METHOD

(75) Inventors: Curtis Christian Crane, York, PA (US); Frank Highland Hill, IV, York, PA (US); Andrew John Graybill, Hellam, PA (US); Ian Michael Casper, Windsor, PA (US)

(73) Assignee: York International Corporation, York, PA (US)

( * ) Notice: Subject to any disclaimer, the term of this patent is extended or adjusted under 35 U.S.C. 154(b) by 1196 days.

(21) Appl. No.: 11/104,079

(22) Filed: Apr. 12, 2005

(65) Prior Publication Data

US 2005/0223725 A1   Oct. 13, 2005

Related U.S. Application Data

(60) Provisional application No. 60/561,435, filed on Apr. 12, 2004.

(51) Int. Cl.
*F25B 39/04*   (2006.01)
*F25B 1/00*   (2006.01)
*F25D 29/00*   (2006.01)

(52) U.S. Cl. .......................... 62/183; 62/163; 62/215; 62/228.4

(58) Field of Classification Search ................. 62/161, 62/163, 181, 183, 228, 4, 296, 215; 310/53, 310/59, 64; 417/14
See application file for complete search history.

(56) References Cited

U.S. PATENT DOCUMENTS

| | | | |
|---|---|---|---|
| 3,398,899 A | 8/1968 | Fry | |
| 3,853,174 A | 12/1974 | Kramer | |
| 4,658,595 A * | 4/1987 | Shimada et al. | ............... 62/179 |
| 4,771,392 A | 9/1988 | Hall | |
| 4,959,969 A | 10/1990 | Okamoto et al. | |
| 5,010,739 A | 4/1991 | Isshiki et al. | |
| 5,067,326 A * | 11/1991 | Alsenz | ........................ 62/193 |
| 5,138,844 A * | 8/1992 | Clanin et al. | ................... 62/89 |
| 5,203,178 A * | 4/1993 | Shyu | ........................... 62/180 |
| 5,261,252 A | 11/1993 | Peruch | |

(Continued)

FOREIGN PATENT DOCUMENTS

JP   61178585 A1   8/1986

(Continued)

*Primary Examiner*—Chen-Wen Jiang
(74) *Attorney, Agent, or Firm*—McNees Wallace & Nurick, LLC

(57) ABSTRACT

A noise control method is provided for a cooling system having at least one refrigerant circuit. The refrigerant circuit includes a compressor, a condenser, at least one condenser fan, and an evaporator. Noise control is only performed periodically in response to requirements for reduced operation at predetermined times. The request for reduced noise triggers the commencement of the noise control method. The noise control method involves reducing the operating speed of the compressor, as well as reducing the operating speed of at least one condenser fan, to within a predetermined range of allowable reduced operating speeds. The noise control method temporarily overrides the ability of the cooling system to fully respond to increased cooling or heating demands. When the noise control method is terminated, such as by the end of the stated period of time requiring reduced noise generation, the system is restored to normal operation, and remains fully responsive to cooling and heating demand until commencement of the next period of reduced noise requirements.

23 Claims, 3 Drawing Sheets

U.S. PATENT DOCUMENTS

| | | | |
|---|---|---|---|
| 5,333,469 A * | 8/1994 | Hullar et al. | 62/181 |
| 5,428,965 A | 7/1995 | Grunwald et al. | |
| 5,777,897 A | 7/1998 | Giorgio | |
| 5,907,955 A | 6/1999 | Park | |
| 5,950,439 A * | 9/1999 | Peterson et al. | 62/80 |
| 6,018,957 A | 2/2000 | Katra et al. | |
| 6,194,858 B1 * | 2/2001 | Chen | 318/473 |
| 6,220,045 B1 | 4/2001 | Kim | |
| 6,257,007 B1 * | 7/2001 | Hartman | 62/183 |
| 6,270,319 B1 * | 8/2001 | Lyszkowski et al. | 417/2 |
| 6,290,140 B1 | 9/2001 | Pesko et al. | |
| 6,381,406 B1 * | 4/2002 | Smith et al. | 318/799 |
| 6,536,675 B1 * | 3/2003 | Pesko et al. | 236/47 |
| 6,931,873 B2 * | 8/2005 | Oomura et al. | 62/228.4 |
| 7,137,775 B2 * | 11/2006 | Hopkins | 415/61 |
| 2003/0053004 A1 * | 3/2003 | Yoon | 348/748 |
| 2004/0264125 A1 * | 12/2004 | Cheng et al. | 361/687 |
| 2005/0047762 A1 * | 3/2005 | Liu et al. | 388/806 |
| 2005/0104185 A1 * | 5/2005 | Shimogishi et al. | 257/686 |
| 2005/0139552 A1 * | 6/2005 | Forsberg et al. | 210/748 |
| 2006/0179859 A1 * | 8/2006 | Nakata et al. | 62/228.1 |
| 2007/0079313 A1 * | 4/2007 | Sakurai | 720/649 |

FOREIGN PATENT DOCUMENTS

| | | | |
|---|---|---|---|
| JP | 02 306041 A | | 12/1990 |
| JP | 03 036448 A | | 2/1991 |
| JP | 03 059339 A | | 3/1991 |
| JP | 03 087546 A | | 4/1991 |
| JP | 07 103546 A | | 4/1995 |
| JP | 09 089347 A | | 4/1997 |
| JP | 09089347 A | * | 4/1997 |
| JP | 09-264564 | | 7/1997 |
| JP | 09 250794 A | | 9/1997 |
| JP | 11201608 A | * | 7/1999 |
| JP | 2000055438 | | 2/2000 |
| JP | 2001-082768 | | 3/2001 |
| JP | 3716593 B2 | | 11/2005 |

* cited by examiner

CHILLER SOUND REDUCTION CONTROL SYSTEM AND METHOD

CROSS-REFERENCES TO RELATED APPLICATIONS

This application claims the benefit of U.S. Provisional Application No. 60/561,435 filed Apr. 12, 2004.

BACKGROUND OF THE INVENTION

The present invention relates generally to a sound reduction control system and method for a cooling system. More specifically, the present invention relates to a system and method for reducing the sound generated by a compressor driven chiller system having a variable speed drive by selectively and controllably reducing the speed of the compressor, the speed of the condenser fans, or the number of operating condenser fans in the system.

In chiller, HVAC or refrigeration systems, a refrigerant gas is compressed by a compressor and passed to a condenser where it exchanges heat with another fluid, such as the ambient air forced over condenser coils by one or more condenser fans. From the condenser, the pressurized refrigerant passes through an expansion device and then to an evaporator. An environment to be cooled is cooled by refrigerant passing through the evaporator. The refrigerant returns from the evaporator back to the compressor, and the cycle is repeated.

Large capacity chiller systems are required to provide adequate cooling of the interiors of large buildings. Such systems typically include one or more compressors, as well as one or more air-cooled condensers having condenser fans for cooling the compressed refrigerant. Compressor speed and condenser fan speed, or number of condenser fans running, are interdependent on one another. When the compressor operates at a higher speed, a higher rate of compressed refrigerant is passed to the condenser. In order to cool the increased flow of compressed refrigerant, a larger rate of heat exchange by the condenser is required. One way to increase condenser heat exchange is to increase airflow across the condenser coils. Accordingly, operation of a higher number of condenser fans, or operation of the fans at a higher speed, will increase airflow around the condenser coils, resulting in higher rate of heat exchange by the condenser.

Increasingly, it is necessary to reduce the total sound generated by chillers during certain times, particularly for chillers installed near residential areas. Indeed, some localities have laws that require sound levels at property lines to be lower at nighttime than during the day. One known method of reducing the chiller noise is to disable the system during selected hours, thereby preventing the generation of noise by the chiller system. However, disabling the chiller system means that no cooling can be performed by the chiller systems, thus causing the interior building temperatures to rise to uncomfortable levels. Therefore, it would be advantageous for a building owner to be able to reduce the sound level of the chiller system at selected times, while maintaining some cooling capability within the building.

The sound generated by a typical air-cooled compressor chiller system is predominately created by the compressor and the condenser fans. Therefore, in order to reduce the amount of sound generated by the chiller system, it is desirable that the compressor and the condenser fan(s) be made to operate more quietly. This goal can be accomplished by several known ways. For example, mechanical modifications such as the application of sound-insulating coatings can be made to the compressor, condenser fans, and any housings encasing such components, to reduce operating noise. Alternatively, new compressors and new condenser fans manufactured with sound-absorbing or sound-attenuating features can be installed. However, such modifications or replacements can be expensive as a result of the materials, labor, and downtime costs that are potentially involved. Therefore, what is needed is a cost-effective method for selectively reducing the noise generated by an installed chiller system.

SUMMARY OF THE INVENTION

What is disclosed is a method of providing noise or sound control of a chiller, HVAC or refrigeration system. A chiller system includes a control panel, a compressor, a condenser arrangement, at least one condenser fan, and an evaporator arrangement. Upon receiving a sound control signal at the control panel, the sound control signal initiates a reduced sound control mode of operation. The reduced sound control mode of operation includes the steps of measuring an operating speed of the compressor; controllably reducing the operating speed of the compressor in response to the measured operating speed of the compressor being greater than a maximum operating speed; the maximum operating speed being directly related to the sound control signal; and measuring an operating speed of the compressor; determining an operating parameter of at least one condenser fan; and controllably altering an operating configuration of the at least one condenser fan in response to the determined operating parameter of the at least one condenser fan being greater than a maximum operating parameter; the maximum operating parameter being directly related to the sound control signal.

Also disclosed is a method of providing sound control in a chiller, HVAC or refrigeration system. The chiller system includes a compressor, a condenser arrangement, at least one condenser fan, and an evaporator arrangement. The method includes the steps of determining whether a sound control signal is received by the control panel; assigning a maximum operating speed for a motor powering the compressor responsive to said sound control signal; assigning a maximum operating parameter for the at least one condenser fan responsive to the sound control signal; determining whether the compressor and the at least one condenser fan are within a corresponding permissible range, wherein the corresponding permissible range has an upper limit of the corresponding maximum operating speed and maximum operating parameter; adjusting at least one of a) the speed of the compressor motor or b) the operating parameter of the at least one condenser fan, responsive to the determination that the compressor and the at least one condenser fan are outside the corresponding permissible range; wherein the step of adjusting the speed operates to reduce the noise generated by the chiller system.

The present invention is also directed to a chiller system. The chiller system includes a control panel, a compressor, a condenser arrangement, at least one condenser fan, and an evaporator arrangement. Also provided is means for receiving a sound control signal at the control panel, the sound control signal being configured to initiate a reduced sound control mode of operation. There is also provide means for measuring an operating speed of the compressor; and means for controllably reducing the operating speed of the compressor in response to the measured operating speed of the compressor being greater than a maximum operating speed. The maximum operating speed is directly related to the sound control signal. Also, means is provide for measuring an operating parameter of at least one condenser fan; and a means for controllably altering the operating configuration of the at least one condenser fan responsive to the sound control signal.

One embodiment of the present invention is directed to a method for reducing the sound level of a chiller system by selectively and periodically limiting the maximum operating speed of the compressor, maximum operating speed of at least one condenser fan, and/or of the number of fans to be operated.

Another embodiment of the present invention is directed to a chiller system having a control panel with a control algorithm for limiting the maximum operating speed of the compressor, and varying the speed of at least one condenser fan or adjusting the total number of operating condenser fans.

One advantage of the present invention is that the sound generated by an installed chiller system can be selectively reduced without requiring mechanical modifications to system components.

Another advantage of the present invention is that comfort cooling in the interior space is not completely sacrificed when the system is required to comply with periodic reduction of sound requirements, such as during nighttime operation.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

The present invention therefore provides systems and methods for selectively controlling the speed of the compressor and the condenser fans of a chiller system to reduce sound generated by the system at selected times. The selective operation of the condenser fans can include any combination of disabling one or more fans, operating less than all fans, operating one or more fans at lower fixed speed, operating one or more fans at a lower variable speed. It is noted that the control of fan speed, as it is describe below, also includes switching some or all of the condenser fans on or off.

Figure 1:
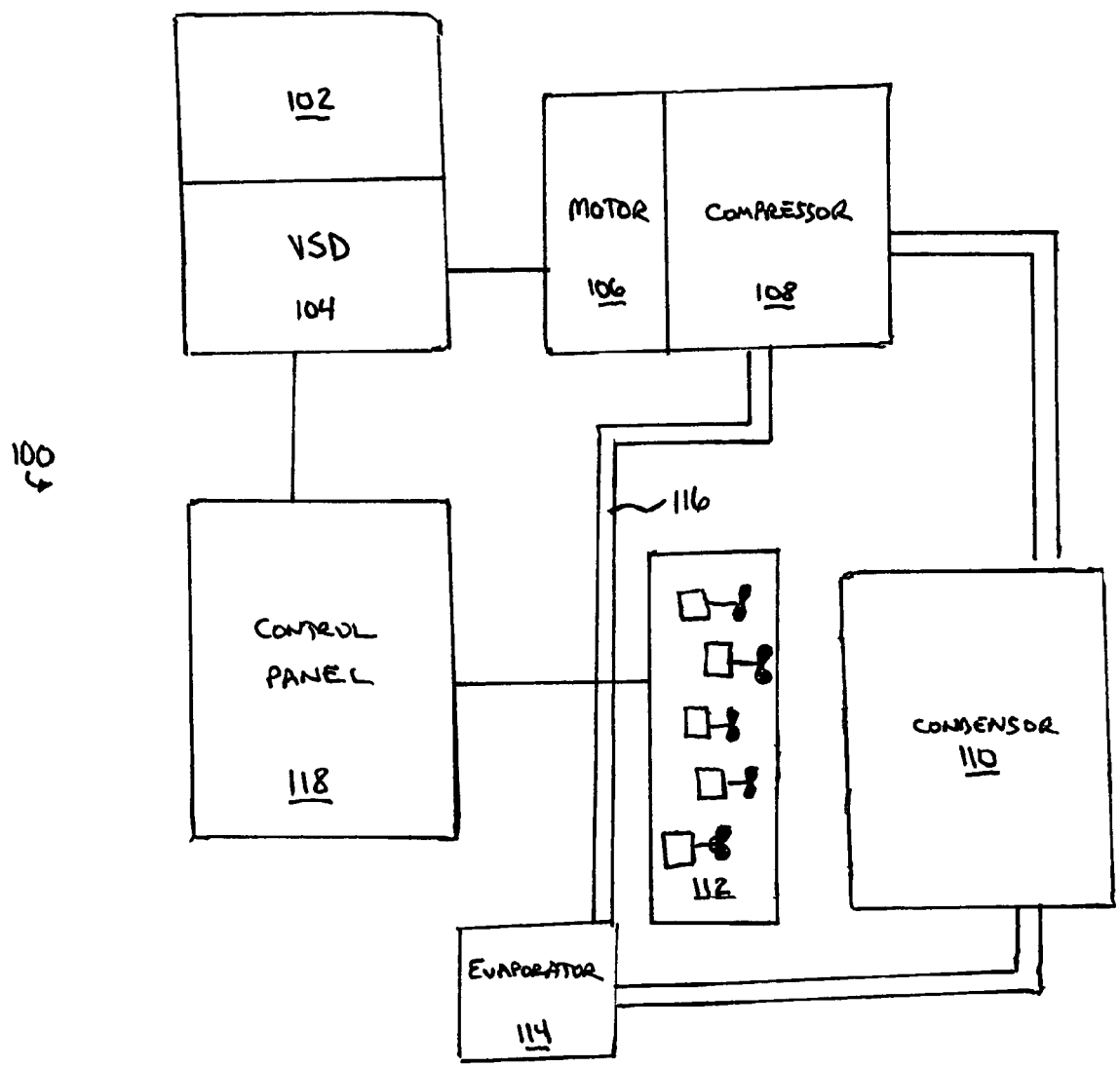
FIG. 1 illustrates schematically an embodiment of a heating, ventilation and air conditioning system for use with the present invention.

FIG. 1 illustrates generally a chiller, HVAC or refrigeration system 100 that can be used with the present invention. An AC power source 102 supplies a variable speed drive (VSD) 104, which powers one or more motors 106. Each motor 106 is used to drive a corresponding compressor 108 that feeds high-pressure and high-temperature refrigerant gas to a condenser 110. The compressor 108 is preferably a screw compressor or centrifugal compressor, however the compressor can be any suitable type of compressor including reciprocating compressors, scroll compressors, or rotary compressors. The output capacity of the compressor 108 can be based on the operating speed of the compressor 108, which operating speed is dependent on the output speed of the motor 106 driven by the VSD 104. The system 100 can include many other features that are not shown in FIG. 1, and those features have been purposely omitted to simplify the drawings for ease of illustration.

The refrigerant vapor delivered to the condenser 110 enters into a heat exchange relationship with a fluid, preferably air. To assist in the passage of the air around the heat exchanger coils of condenser 110, at least one fan 112 can be used to force or draw air over the coils of the condenser 110. More preferably, a bank of multiple condenser fans 112 can be used. Each condenser fan 112 can be single speed, multiple fixed speed, or variable speed in nature, depending upon the type of fan and drive mechanism. In each embodiment, the condenser 110 is cooled by at least one condenser fan 112.

The condensed liquid refrigerant from condenser 110 flows through an expansion device to an evaporator 114. The evaporator 114 can include connections for a supply line and a return line of a cooling load. A secondary liquid, which is preferably water, but can be any other suitable secondary liquid, e.g. ethylene, calcium chloride brine or sodium chloride brine, travels into the evaporator 114 via return line and exits the evaporator 114 via supply line. The liquid refrigerant in the evaporator 114 enters into a heat exchange relationship with the secondary liquid to chill the temperature of the secondary liquid. The refrigerant liquid in the evaporator 114 undergoes a phase change to a refrigerant vapor as a result of the heat exchange relationship with the secondary liquid. The vapor refrigerant in the evaporator 114 then returns to the compressor 108 via a suction pipe 116 to complete the cycle. It is to be understood that any suitable configuration of condenser 110 and evaporator 114 can be used in the system 100, provided that the appropriate phase change of the refrigerant in the condenser 110 and evaporator 114 is obtained.

A control panel 118 is provided to control operation of the VSD 104 to monitor and control operation of the motor 106, thus controlling the operating speed of the compressor 108. The control panel 118 further permits monitoring and control of the operation of each condenser fan 112. The control panel 118 also allows interdependent and selective operation and control of the VSD 104 and motor 106, as well as the condenser fans 112. With respect to the selective operation of each condenser fan 112, the control panel 118 can selectively disable each fan 112, and can preferably adjust the operating speed of each fan 112 if the fan 112 is capable of multiple operating speeds. Fans 112 may be variable speed fans linked to a common VSD (not shown) dedicated to controlling the speed of condenser fans to allow nearly infinite adjustment of fan speed using the control panel 118. Alternatively, where fixed speed fans are used in a bank of multiple condenser fans 112, the fans 112 are configured so that less than all fans can be selectively operated at any given time. As another alternative, condenser fans 112 may also be commonly linked to VSD 104 along with motor 106; as yet another alternative, fans 112 may be multiple fixed speed fans, typically two-speed, configured to operate in various combinations of high-speed, low-speed and off.

In an alternative embodiment, the system can alternatively include two or more compressors incorporated in corresponding refrigerant circuits, and it is to be understood that the system can have one refrigerant circuit, two refrigerant circuits, or more than two refrigerant circuits for providing the desired system load and can have more than one compressor for each refrigerant circuit. Such an alternative system can further include a condenser arrangement wherein a single condenser is partitioned or otherwise configured to allow operation of two separate refrigerant circuits within a single condenser housing so that the refrigerant output by each compressor is not mixed with output from other compressors.

Similarly, the system 100 can include an evaporator arrangement wherein a single evaporator housing is provided to serve two or more separate refrigeration circuits. For example, the condenser housing and evaporator housing can maintain the separate refrigerant circuits either through a partition or other dividing means with the evaporator housing, or by providing separate coil arrangements. In yet another embodiment of the present invention, the refrigerant output by two or more compressors can be combined into a single refrigerant circuit to travel through the components of the system before being separated to reenter the compressors.

Preferably, the control panel 118 includes a microprocessor or controller to provide control signals to the VSD 104 to control the operation of the VSD 104. More preferably, the control panel 118 can control the output power of the VSD 104 to control the speed of the motor 106, and the compressor 108, to satisfy the sound requirements of the operating environment of the system during periods requiring reduced noise operation. Most preferably, the control panel 118 can control the VSD 104 to operate the motor 106 within a predetermined range of speed during periods requiring reduced noise operation, which has the effect of lowering the condenser discharge pressure. The reduced discharge pressure causes some or all condenser fans 112 to shut down due to the reduced cooling demand. If variable speed type condenser fans 112 are employed, one or more VSDs may be provided. Reducing the compressor speed in this instance causes the condenser fans 112 to operate at reduced speed, rather than shutting down a portion of the fans in the system.

In a preferred embodiment, the control panel 118 executes a control algorithm(s) or software to control operation of the system 100, and to determine and implement an operating configuration for the VSD 104 to operate the compressor 108. The control algorithm or software of the control panel also determines, implements, and controls the speed of each condenser fan 112 in order to satisfy the sound requirements of the operating environment, while still providing some condenser cooling. In one embodiment, the control algorithm(s) can be computer programs or software stored in the non-volatile memory of the control panel 118 and can include a series of instructions executable by the microprocessor of the control panel 118. While it is preferred that the control algorithm be embodied in a computer program(s) and executed by the microprocessor, it is to be understood that the control algorithm may be implemented and executed using digital and/or analog hardware by those skilled in the art. If hardware is used to execute the control algorithm, the corresponding configuration of the control panel 118 can be changed to incorporate the necessary components and to remove any components that may no longer be required.

The reduced noise control process can be initiated in response to user input, or can be initiated automatically, such as by a preprogrammed instruction from a system primary control program. The reduced noise control process can be a stand-alone process or program, or it can be incorporated into a larger control process or program, such as a capacity control program for the chiller system. For example, the control process can be used to generate an industry standard 4-20 mA or 0-10V signal as a noise control signal to be sent to the VSD 104 to reduce the maximum allowed compressor 108 speed, as well as to limit the maximum operational speed of each condenser fan 112. Alternately, the noise control signal can also be generated from a user interface such as a keypad on the control panel 118, or the noise control signal can be automatically generated such as by a microprocessor control of the control panel 118. The noise reduction control process prevents the VSD 104 from providing power at a frequency higher than the maximum value specified by the noise control signal. The noise control signal may also limit the maximum speed of at least one condenser fan 112 or the maximum number of condenser fans 112 that can operate. By limiting the maximum frequency or speed of the VSD 104, compressor 108 and optionally, fan 112, the system 100 is prevented from exceeding a given sound level during particular periods of operation. The sound reduction is due in part to the compressor 108 being quieter when operating at a lower speed within a predetermined speed range. The sound reduction is further due to quieter operation of condenser fan 112 as a result of lower fan speed. In alternative embodiments having multiple condenser fans 112, the control panel 118 reduces total fan noise in noise control mode by selectively operating less than all fans 112, or by operating all fans 112 at low speeds within a predetermined range of fan speeds permitted by the noise control signal.

In another embodiment, the control panel 118 can also allow the discharge pressure in the condenser 110 to rise during periods when a low system sound level is desired to be maintained. This is achieved by raising the pressure settings for some or all of the condenser fan(s) 112 to allow the pressure in the condenser 110 to rise during periods when a low system sound level is desired to be maintained. Increasing the pressure in the condenser will result in less cooling need in the condenser 110, thereby allowing operation of condenser fans 112 at lower speed, and/or operation of fewer fans 112 within a multiplicity of provided condenser fans 112. The pressure setting is adjusted electronically by the control algorithm, by changing the discharge pressure setpoint stored in the control panel. Raising of the discharge pressure setpoint reduces the need for cooling in the condenser as the condenser is allowed to run hotter and at a higher pressure.

A control program or algorithm executed by a microprocessor or control panel 118 is used to determine the speed of the compressor 108, as well as to control other system parameters such as the operational status and speed of any condenser fans 112. The control program can receive a variety of inputs, such as temperature, pressure and/or flow measurements, to be used in making the determination of when to reduce the speed of the compressor 104 and condenser fans 112. It is to be understood that the particular control program and control criteria for reducing compressor speed and condenser fan speed can be selected based on the particular performance requirements of the system 100.

In addition, the system 100 can include one or more sensors for detecting and measuring operating parameters of the system 100. The signals from the sensors can be provided to a microprocessor or control panel 118 that controls the operation of the system 100. Sensors can include pressure sensors, temperature sensors, flow sensors, or any other suitable type of sensor for evaluating the performance of the system 100.

The operation of the system 100 in the reduced noise control mode is controlled by a control panel 118. The control panel 118 can receive input signals from a microprocessor, or alternatively from a user interface, indicating a demand for reduced noise. The control panel 118 then processes these input signals using the control method of the present invention and generates the appropriate control signals to the components of the system 100, including the VSD 104, compressor 108, and condenser fans 112 to obtain the desired reductions in operating speed to reduce noise generated by the components, and thus reducing the total noise generated by the system 100.

In the preferred embodiment of the reduced noise control mode, the control panel 110 and noise control algorithm only overrides the normal capacity control features of the system when those capacity controls attempt to operate the compressor or the condenser fans above the limits imposed by the noise control algorithm. Simply put, in the noise control mode, cooling demand is still monitored, and capacity control features can respond to operate the compressors and condenser fans, but the noise control mode places an upper limit on system capacity. Cooling demand is independent of the chiller and is a function of the building or process being cooled. The noise control process of the present invention sets a maximum frequency for each compressor 108, as well as a maximum speed or number of condenser fans 112 to be operated. Those frequency or speed limits are imposed on the capacity control algorithms, including the compressor and the condenser fan control algorithms. If those capacity control algorithms do not call for the controlled component to be operated above the provided limits, the noise control algorithm does not interfere with normal operation. However, if the system algorithms call for operating the components above the provided limits, they are overridden by the noise control algorithm.

Figure 2:
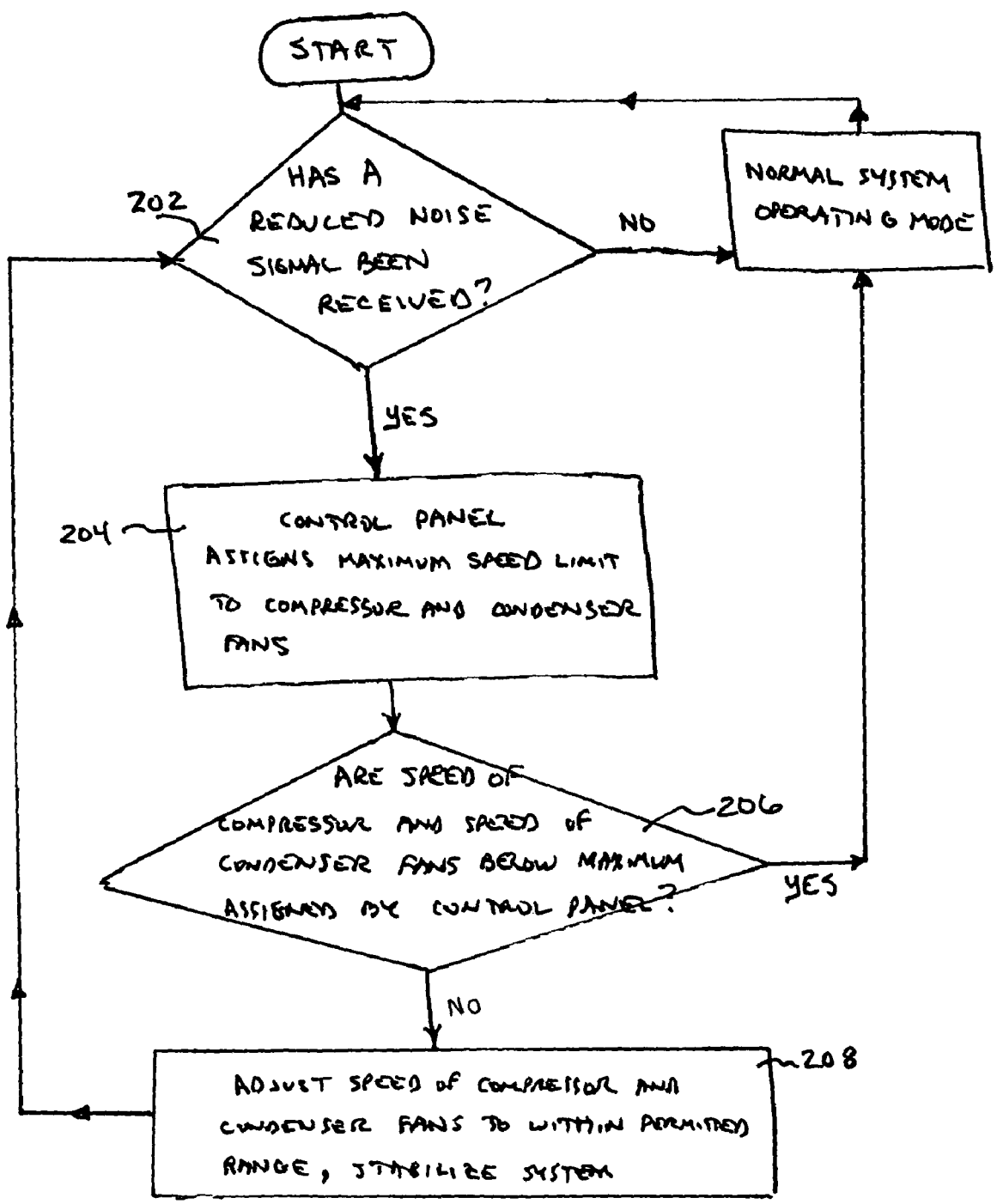
FIG. 2 illustrates a flow chart detailing one embodiment of the noise control methods of the present invention.
Figure 3:
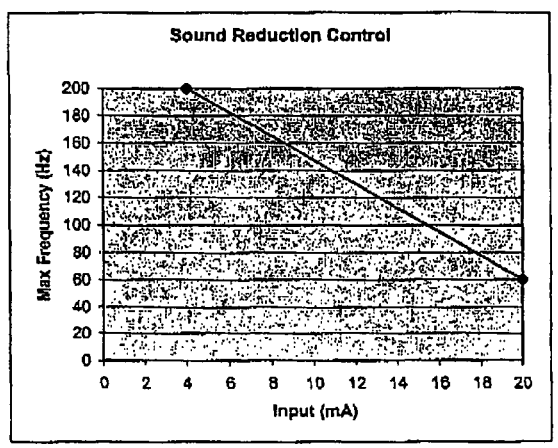
FIGS. 3-4 illustrate the effect of an input signal on the maximum frequency of a compressor and condenser fan in one embodiment of the present invention.
Figure 4:
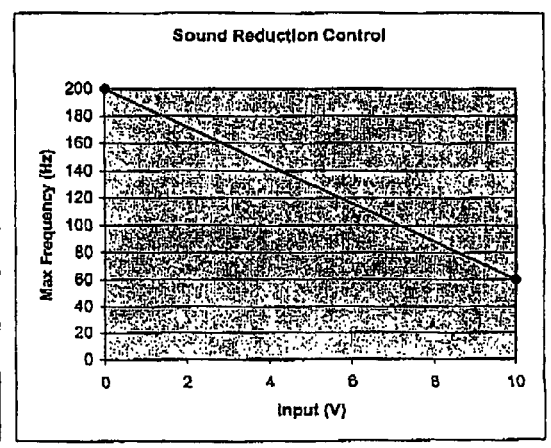

FIG. 2 illustrates a flow chart detailing one embodiment of the reduced noise control process of the present invention for the exemplary system 100 shown in FIG. 1. The process begins with a determination of whether a reduced noise control signal has been received in step 202. The reduced noise control signal is either generated automatically such as by a microprocessor controller, timer, or user interface linked to the control panel 118. The noise control signal can be preset or variable, and is based upon the noise profile and properties of the particular system 100. Preferably, the noise control signal is variable so as to allow for selective reduction of total noise generated by the system and corresponding cooling effect in the reduced noise mode. More preferably, the noise control signal is variable and is automatically initiated at predetermined times and for predetermined periods. The relationship between system noise and the speed of the compressor 108 and condenser fan 112 will vary depending upon the type and number of compressors 108 and fans 112 incorporated into the system 100. For example, FIGS. 3-4 illustrate an exemplary relationship between the maximum VSD frequency for a standard 4-20 mA input and a standard 0-10V input on a compressor 108 having a 200 Hz maximum running frequency. For each chiller system 100, a similar relationship can be derived between sound level and operating frequency of the compressor 108 and condenser fans 112 to determine the effect of operating at given frequencies on the sound level generated by the chiller system 100.

If a reduced noise control signal is not received in step 202, the system 100 operates in normal mode based upon heating and cooling demand and other system control inputs. However, if a reduced noise control signal is received, the system enters noise control mode, and the process continues to step 204. In step 204, the control panel 118 processes the noise control input signal to assign a corresponding maximum operating speed or frequency to the compressor 108, as well as to assign a corresponding maximum speed or frequency for the condenser fan 112 or the maximum number of fans to operate. Preferably, this variable noise control signal is generated via a straight line but can be based on any function, equation, or lookup table. When the minimum sound control signal is received in step 202, the compressor maximum speed is allowed to reach an upper speed limit, which may correspond to the maximum speed of the compressor. The minimum sound control signal generally provides the least amount of sound reduction. When the maximum sound reduction signal is received in step 202, the compressor maximum speed is reduced down to its minimum speed. All other sound reduction signal inputs in step 202 fall on the straight line connecting the two points, as in FIGS. 3 and 4.

In one aspect of the system, the level of the noise control signal may be determined over the range of operating frequencies. The maximum motor operating frequency is a characteristic of the make and model of the various compressor or fan motor(s). The minimum motor operating frequency for the motor(s) is normally approximately 50 Hz. After determining the span of the frequency range associated with the analog signal, the sound levels along the range may be plotted by measuring the sound level at each operating frequency. Preferably the operating frequency may be referenced as a percentage of the maximum speed of the motor or motors by a control algorithm. A table may be constructed from the plotted sound measurements of the actual decibel level of a specified operating frequency, or for the corresponding percentage of maximum speed.

In this way, the system operator may select the level of the noise control signal to be applied when the system is in noise control mode, by reference to a table or graph representation of the noise versus frequency profile. If a desired noise level is known by the operator, the associated operating frequency may be selected, for setting the noise control signal level. Such a table may optionally be stored on a memory storage device accessible by the control panel, and a user input device may be provided either at the control panel or at a remote terminal, for entering a desired parameter, for example, the desired maximum decibel level or the maximum operating frequency. The control panel may then establish a level for the noise control signal by referencing the value of the input parameter in the table.

In the preferred embodiment, the control panel 118 processing includes relaying the processed noise control signal to a common VSD 104 configured to permit interdependent control of the speed of the motor 106, and thus the speed of the compressor 108. The condenser fan 112 may be controlled by a separate VSD, or a plurality of condenser fans 112 may be provided having any combination of either fixed speed fans, variable speed fans, or both so as to permit adjustable control of airflow across the condenser 110 by controlling the number and speed of operating fans 112. If more than one variable speed condenser fan is used, two or more fans 112 may be controlled by a common VSD, or each condenser fan may be controlled by a separate VSD.

The process continues to step 206 to determine whether the current rate of speed of the compressor 108 and the speed or number of the condenser fans 112 are within a predetermined range permitted by the reduced noise control signal received in step 202. If the compressor 108 and condenser fan 112 of the system 100 are operating within the operational speed range permitted by the reduced noise control signal received in step 202, no adjustments are made to the speed of the compressor 108 and condenser fans 112, and the system operates in the "normal" mode. If the compressor or any fans are operating above the permitted maximum speed, the process continues to step 208, where the control panel adjusts the speed of the compressor 108 and/or fans 112, to a speed that is equal to or less than the maximum speed permitted by the noise control signal. In a preferred embodiment, in step 208, the control panel 110 continues to monitor system pressures and temperatures, such as discharge pressure and leaving chilled liquid temperature, and can adjust the speed of the compressor 108 as well as the speed of any condenser fan 112 within the operating range at or below the maximum speeds allowed by the control input signal in order to control the system 100. By maintaining stable operation of the compressor 108 in the reduced noise mode, the system 100 maintains some cooling while operating in the reduced noise mode. In another embodiment of the reduced noise mode, in step 208, the system 100 can permit the condenser fan 112 to initially operate at speeds in excess of the maximum operating speed permitted by the noise control signal until such time as the system temperature and pressures have stabilized for the lower operating speed of the compressor 108.

The process next returns to step 202 to determine if a reduced noise control signal remains present. If the noise control signal remains present, the above-described process is repeated. If the noise control signal is not detected, the system returns to normal operating mode where it can respond to heating and cooling demands.

The control panel 118 determines whether there is a noise control signal present at least once during every control program loop. The various types of noise control signal include remote signal, programmed value, or other types as discussed above. If the noise control signal changes state, by increasing, decreasing or going away, the control algorithm makes a corresponding adjustment to the maximum speed of the compressor 108. Preferable, a timer is associated with the remote system to restrict the number of adjustments that can be made to the chiller system by the remote system in a predetermined time period. For example, the timer may prevent the remote system from changing the noise control signal more often than the timer cycle, which cycle may vary from 5 minutes to 60 minutes. The timer cycle could be more or less than that range, if suitable for the design parameters of the particular chiller system. The timer prevents the chiller system from becoming unstable due to more frequent changes of the noise control signal and the system parameters affected by the noise control signal.

In another embodiment of the present invention, the user of system 100 can view the control panel 118, such as by viewing a connected user interface (not shown) to determine the particular system operating mode. For example, if an LED provided on the control panel 118 or user interface is flashing, then the system 100 can be in noise control mode despite any demand for cooling or heating. However, if the LED on the control panel 118 or user interface is not flashing, the system 100 can be in normal operating mode to respond to any demand for cooling or heating. It is to be understood that the display method on the control panel 118 or user interface can be modified for the particular requirements or needs of the user.

As noted above, in the typical chiller system, the refrigerant vapor delivered to the condenser 110 enters into a heat exchange relationship with a fluid, preferably air. For purposes of the present invention, if heat exchange is effected by a fluid other than air, e.g., a liquid, then the system would not use fans, and noise control is be accomplished solely by regulating the frequency of the compressor motor and, thus, the speed of the compressor.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of providing sound control for a vapor compression system, the method comprising:
   providing a compressor, a condenser, and at least one condenser fan;
   executing a control algorithm to control an operating speed of the compressor and an operating parameter of the at least one condenser fan;
   determining receipt of a sound control signal, receipt of the sound control signal initiating a reduced sound control program, the reduced sound control program comprising:
      determining a maximum compressor operating speed in response to the sound control signal, the maximum compressor operating speed being variable based on a value of the sound control signal;
      determining a maximum condenser fan operating parameter in response to the sound control signal, the maximum condenser fan operating parameter being variable based on a value of the sound control signal;
      determining an operating speed of the compressor;
      determining an operating parameter of the at least one condenser fan;
      overriding the control algorithm in response to at least one of the determined operating speed of the compressor being greater than the maximum compressor operating speed or the determined operating parameter of the at least one condenser fan being greater than the maximum condenser fan operating parameter, overriding the control algorithm comprising at least one of:
         controllably reducing the operating speed of the compressor controlled by the control algorithm to a speed less than or equal to the maximum compressor operating speed; or
         controllably altering an operating configuration of the at least one condenser fan; and
      controlling an operating speed of the compressor and an operating parameter of the at least one condenser fan with the control algorithm in response to the determined operating speed of the compressor being less than the maximum compressor operating speed and the determined operating parameter of the at least one condenser fan being less than the maximum condenser fan operating parameter.

2. The method of claim 1, wherein the at least one condenser fan comprises a plurality of condenser fans and the step of controllably altering the operating configuration of the at least one condenser fan is selected from the group consisting of: disabling one or more condenser fans of the plurality of condenser fans, operating less than all of the condenser fans, operating one or more condenser fans of the plurality of condenser fans at a reduced fixed speed, and operating one or more condenser fans of the plurality of condenser fans at a reduced variable speed.

3. The method of claim 2, wherein said step of controllably altering the operating configuration of the at least one condenser fan includes selectively disabling one or more condenser fans of the plurality of condenser fans.

4. The method of claim 2, wherein said controllably altering the operating configuration of the at least one condenser fan further includes adjusting the speed of one or more condenser fans of the plurality of condenser fans.

5. The method of claim 2, wherein the control algorithm comprises software executable for controlling the at least one compressor motor and at least one condenser fan interdependently, and for adjusting the speed of one or more condenser fans of the plurality of condenser fans.

6. The method of claim 1, further comprising manually providing the sound control signal through a user interface.

7. The method of claim 1, further comprising providing the sound control signal through a control program.

8. The method of claim 1 wherein the step of controllably reducing the operating speed of the compressor includes reducing an output frequency from a variable speed drive used to power a motor for the compressor.

9. The method of claim 1 wherein the step of controllably altering the operating configuration of the at least one condenser fan includes raising the condenser discharge pressure setting.

10. A method of providing sound control in a chiller system having a compressor, a condenser, and at least one condenser fan, the method comprising:
   determining whether a sound control signal is received by a control panel;
   assigning a maximum operating speed for the compressor responsive to the sound control signal, the maximum operating speed being variable based on a value of the sound control signal;
   assigning a maximum operating parameter for the at least one condenser fan responsive to the sound control signal, the maximum operating parameter being variable based on a value of the control signal;
   determining whether the compressor and the at least one condenser fan are operating within corresponding permissible ranges, wherein the corresponding permissible range for the compressor has an upper limit corresponding to maximum operating speed and the corresponding permissible range for the at least one condenser fan has an upper limit corresponding to the maximum operating parameter;
   adjusting at least one of the speed of the compressor to within the corresponding permissible range or the operating parameter of the at least one condenser fan to within the corresponding permissible range responsive to the determination that the compressor or the at least one condenser fan are operating outside the corresponding permissible range;
   controlling an operating speed of the compressor and an operating parameter of the at least one condenser fan with a control algorithm for the chiller system in response to the determination that the compressor and the at least one condenser fan are operating inside the corresponding permissible range; and
   wherein the step of adjusting operates to reduce sound generated by the chiller system.

11. The method as set forth in claim 10, further comprising transmitting the sound control signal to a variable speed drive, wherein said variable speed drive being configured to permit interdependent control of
   the speed of the compressor; and
   the operating parameter of the at least one condenser fan.

12. The method as set forth in claim 10, further comprising controlling the number of operating condenser fans in response to the adjusted operating parameter of the at least one condenser fan, wherein the at least one condenser fan comprises a plurality of condenser fans.

13. The method as set forth in claim 10, wherein the at least one condenser fan comprises a plurality of condenser fans selected from the group consisting of fixed speed fans, variable speed fans, or combinations thereof; and further comprising controlling the speed of operating condenser fans in response to the adjusted operating parameter of the at least one condenser fan.

14. The method as set forth in claim 10, further comprising operating the compressor at a reduced speed while operating the at least one condenser fan at a speed outside the permissible range associated with the sound control signal for an initial period until chiller system parameters become stabilized for operation of the chiller system at the reduced operating speed of the compressor; and reducing the speed of the at least one condenser fan after reaching a stable operating range of the chiller system, the reduced speed of the at least one condenser fan being compatible with the speed of the compressor.

15. A system comprising:
   a control panel, a compressor, a condenser, at least one condenser fan, and an evaporator;
   the control panel being configured to receive a sound control signal, the sound control signal being configured to initiate a reduced sound control mode of operation;
   a sensor to measure an operating speed of the compressor;
   the control panel being configured to controllably reduce the operating speed of the compressor to below a maximum operating speed with the reduced sound control mode of operation in response to the measured operating speed of the compressor being greater than the maximum operating speed; the maximum operating speed being variable based on a value of the sound control signal;
   a sensor to measure an operating parameter of at least one condenser fan;
   the control panel being configured to controllably alter an operating parameter of the at least one condenser fan with the reduced sound control mode of operation responsive to the sound control signal;
   the control panel being configured to control an operating speed of the compressor and an operating parameter of the at least one condenser fan with a control algorithm for the system in response to the measured operating speed of the compressor being less than the maximum operating speed.

16. The chiller system of claim 15 wherein the at least one condenser fan comprises a plurality of condenser fans, the plurality of condenser fans being configured from one of the group consisting of: a) one or more condenser fans of the plurality of condenser fans is disabled, b) less than all condenser fans of the plurality of fans are operable, c) one or more condenser fans of the plurality of condenser fans operate at a reduced fixed speed; and d) one or more condenser fans of the plurality of condenser fans operate at a reduced variable speed.

17. The system of claim 15, wherein said at least one condenser fan is selected from the group consisting of: single speed fan, multiple speed fan, and variable speed fan.

18. The chiller system as set forth in claim 15, wherein the control panel being configured to controllably alter the operating configuration of the at least one condenser fan includes the control panel being configured to selectively disable the at least one condenser fan.

19. The chiller system as set forth in claim 15, wherein the control panel being configured to controllably alter the operating configuration of the at least one condenser fan includes the control panel being configured to adjust the speed of the at least one condenser fan.

20. The chiller system as set forth in claim 15, wherein said control panel including software executable for controlling the compressor and at least one condenser fan interdependently, and for adjusting the speed of the at least one condenser fan.

21. The chiller system as set forth in claim 15, wherein the control panel being configured to controllably reducing the operating speed of the compressor includes the control panel being configured to reduce an output frequency from a variable speed drive used to power a motor for the compressor.

22. The chiller system as set forth in claim 15, wherein the control panel being configured to controllably alter the operating configuration of the at least one condenser fan includes the control panel being configured to raise the condenser discharge pressure setting.

23. The chiller system as set forth in claim 15, further comprises a variable speed drive configured to permit interdependent control of
    the speed of the compressor; and
    the operating parameter of the at least one condenser fan;
    each of the compressor and the at least one condenser fan is driven by the speed drive;
    wherein interdependent control causes an increase or decrease in the operating parameter of the at least one condenser fan in proportion to a corresponding increase or decrease in the speed of the compressor.

\* \* \* \* \*